(12) United States Patent
Park et al.

(10) Patent No.: US 8,277,537 B2
(45) Date of Patent: Oct. 2, 2012

(54) METHOD OF MANUFACTURING ULTRA LOW CARBON FERRITIC STAINLESS STEEL

(75) Inventors: Joo Hyun Park, Pohang-si (KR); Sun Min Byun, Pohang-si (KR); Sang Beom Lee, Pohang-si (KR); Min Oh Suk, Pohang-si (KR); Hee Ho Lee, Pohang-si (KR)

(73) Assignee: Posco, Gyeongsangbuk-do (KR)

( * ) Notice: Subject to any disclaimer, the term of this patent is extended or adjusted under 35 U.S.C. 154(b) by 100 days.

(21) Appl. No.: 12/747,451

(22) PCT Filed: Sep. 30, 2008

(86) PCT No.: PCT/KR2008/005745
§ 371 (c)(1), (2), (4) Date: Sep. 15, 2010

(87) PCT Pub. No.: WO2009/075464
PCT Pub. Date: Jun. 18, 2009

(65) Prior Publication Data
US 2011/0041653 A1 Feb. 24, 2011

(30) Foreign Application Priority Data
Dec. 12, 2007 (KR) .......... 10-2007-0129304

(51) Int. Cl.
C21C 7/072 (2006.01)
C21C 7/076 (2006.01)
C21C 7/10 (2006.01)

(52) U.S. Cl. ............... 75/512; 75/548; 75/558; 75/568; 75/570; 75/582

(58) Field of Classification Search .......... 75/582, 75/512, 548, 568, 570, 558
See application file for complete search history.

(56) References Cited

U.S. PATENT DOCUMENTS
3,754,894 A * 8/1973 Saccomano et al. ............ 75/557
(Continued)

FOREIGN PATENT DOCUMENTS
JP 8-260030 10/1996
(Continued)

OTHER PUBLICATIONS
Katayama, Kenichi et al. JP 08-260030 A, publsied Oct. 8, 1996. Machine Translation.*
(Continued)

*Primary Examiner* — George Wyszomierski
*Assistant Examiner* — Tima M McGuthry Banks
(74) *Attorney, Agent, or Firm* — Finnegan Henderson Farabow Garrett & Dunner LLP

(57) ABSTRACT

A method of manufacturing a ferritic stainless steel containing an ultra low level of carbon concentration in molten steel within time shorter than existing technology by controlling content, appropriate composition, and liquid-state fraction, etc., of $Cr_2O_3$ in slag to maximize vacuum decarburization refining efficiency, the method comprising: tapping molten steel to a ladle in a non-deoxidized state after pre-decarburization and denitrification in an ARGON OXYGEN DECARBURIZATION refining furnace and then removing non-deoxidized slag; placing the ladle in a vacuum furnace, reducing pressure and then blowing-in oxygen gas from the upper of the molten steel through a lance; creating $Al_2O_3$ by injecting Al at point of time of beginning of oxygen blowing; forming $CaO$—$Al_2O_3$—$Cr_2O_3$—$MgO$-based slag by injecting calcium oxide at point of time of completion of the oxygen blowing; and supplying inert gas through a porous plug on a bottom of the ladle.

8 Claims, 3 Drawing Sheets

U.S. PATENT DOCUMENTS

| | | | |
|---|---|---|---|
| 4,417,924 A | * 11/1983 | Schwer | 75/329 |
| 6,190,435 B1 | * 2/2001 | Miyamoto et al. | 75/511 |
| 7,497,987 B2 | * 3/2009 | Yamashita et al. | 266/207 |
| 2009/0019968 A1 | * 1/2009 | Tada et al. | 75/10.41 |

FOREIGN PATENT DOCUMENTS

| | | |
|---|---|---|
| JP | 08260030 A * | 10/1996 |
| JP | 11-106823 | 4/1999 |
| KR | 2003-0003846 | 1/2003 |

OTHER PUBLICATIONS

International Search Report from the Korean Patent Office for International Application No. PCT/KR2008/005745, mailed Mar. 31, 2009.

* cited by examiner

[Fig. 1]
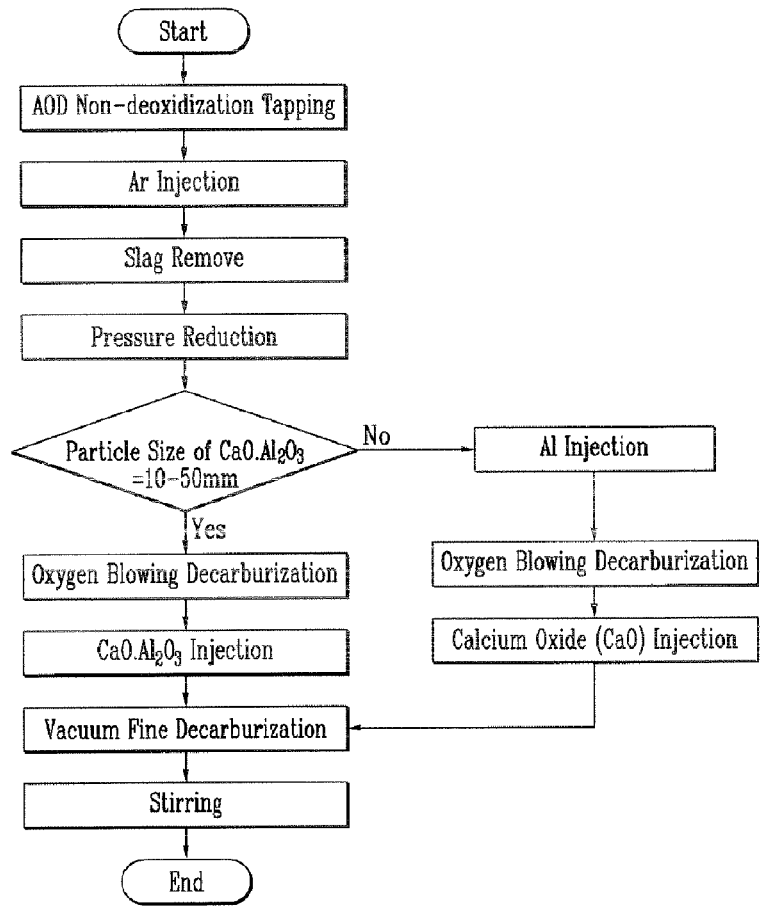
[Fig. 2]
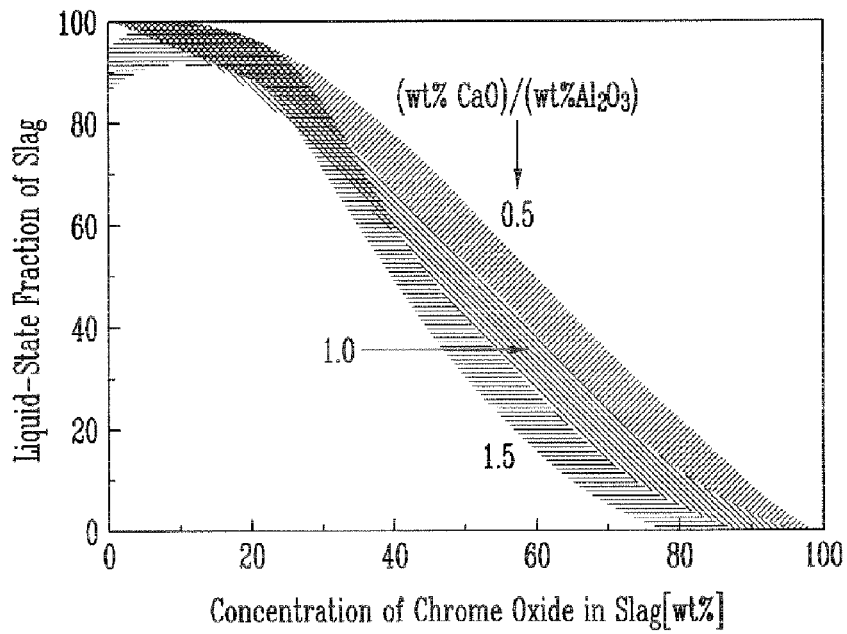

[Fig. 3]
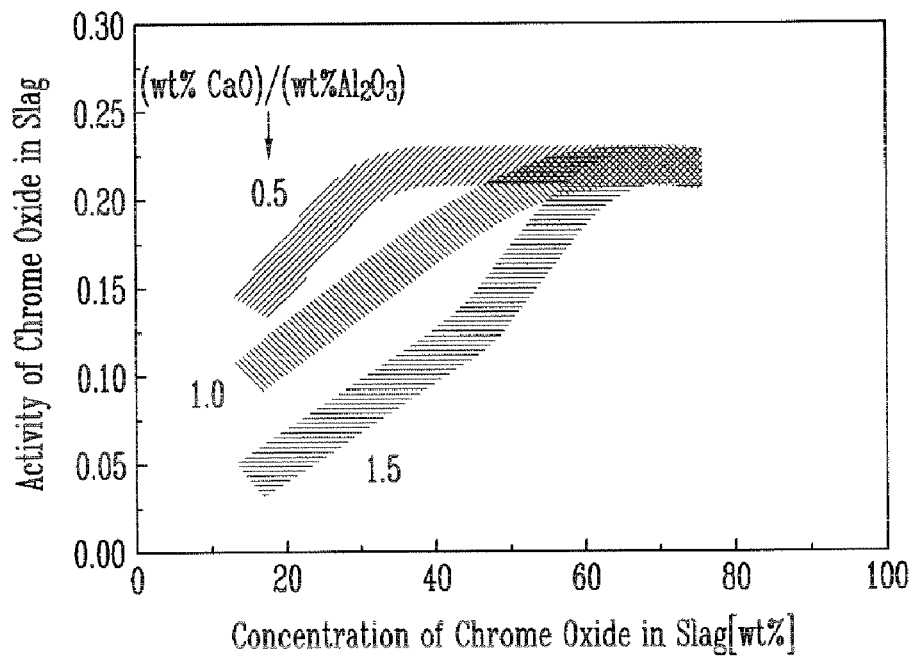
[Fig. 4]
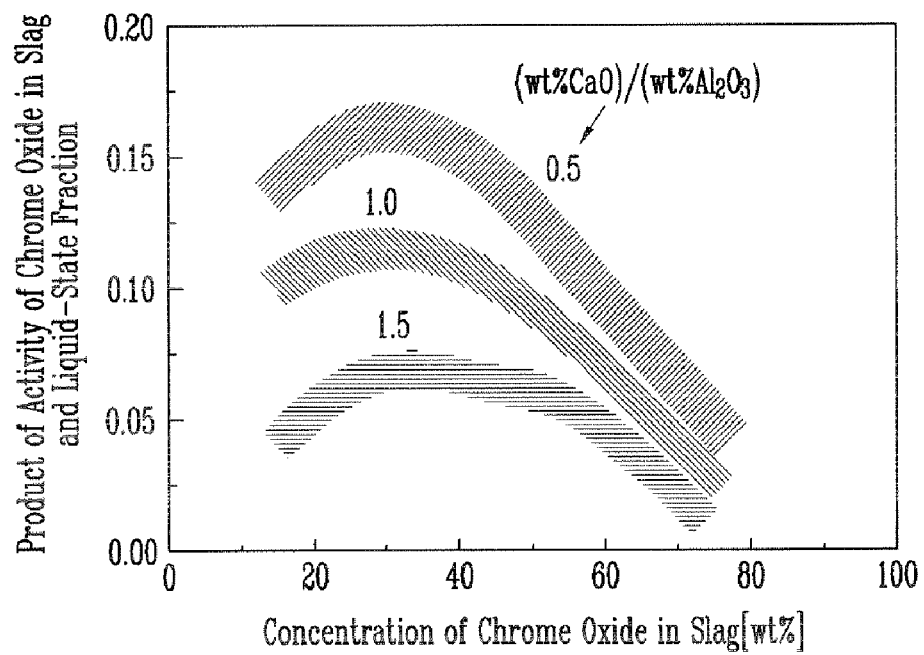

[Fig. 5]
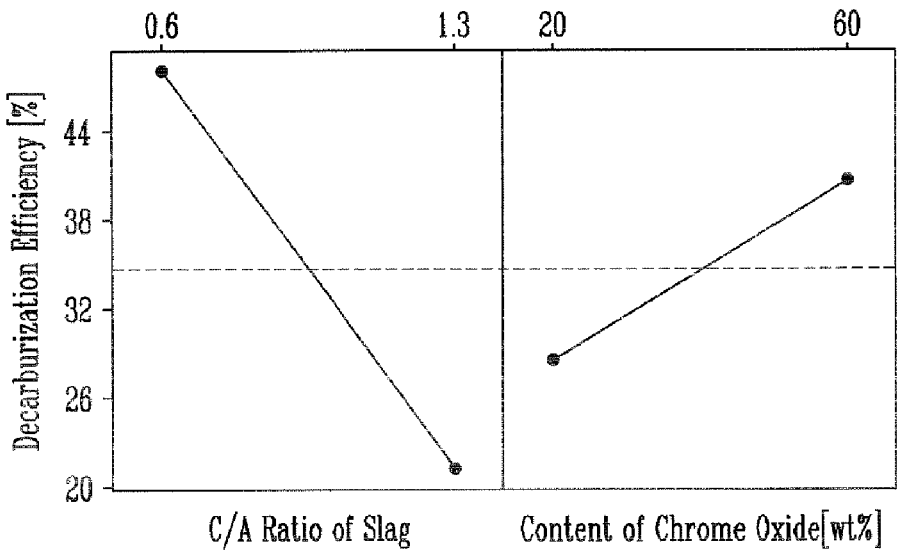
[Fig. 6]
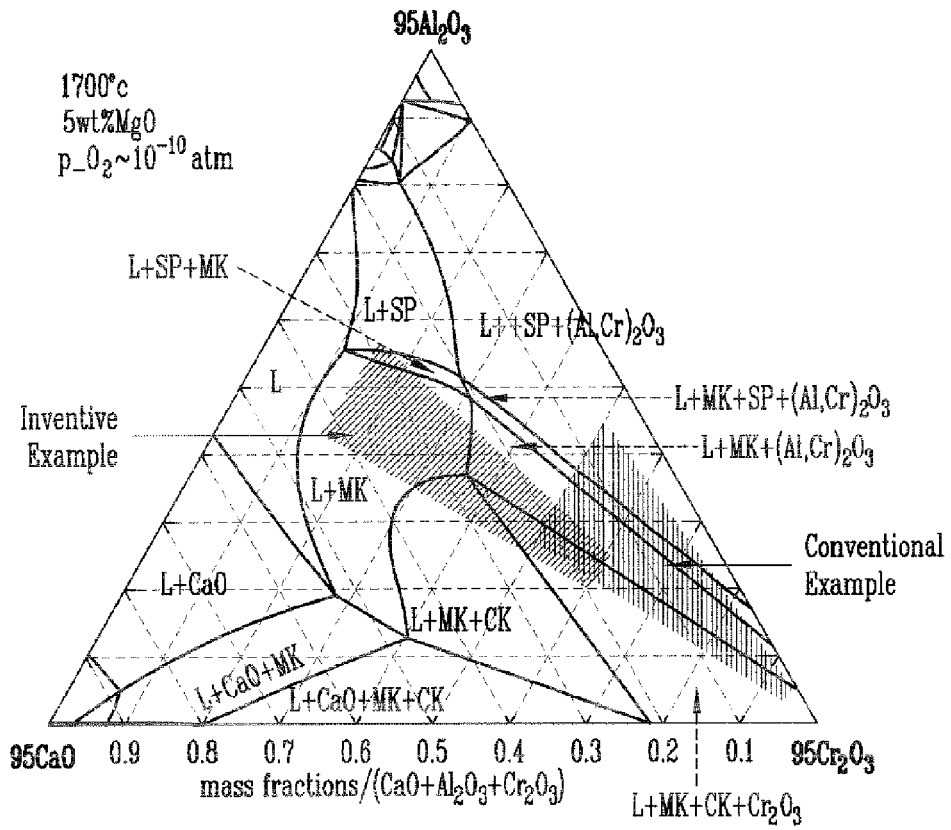
L: liquid, MK: MgO.Cr$_2$O$_3$, CK: CaO.Cr$_2$O$_3$, SP: (Mg,Al)(Al,Cr)$_2$O$_4$

METHOD OF MANUFACTURING ULTRA LOW CARBON FERRITIC STAINLESS STEEL

CROSS REFERENCE TO RELATED APPLICATIONS

This application is a National Stage application of International Application No. PCT/KR2008/005745, filed Sep. 30, 2008, and claims priority of Korean Pat. Application No. 10-2007-0129304, filed Dec. 12, 2007.

TECHNICAL FIELD

The present invention relates to a method of manufacturing a high-purity ferritic stainless steel containing an ultra low level of carbon, and more specifically to a method of manufacturing an ultra low carbon ferritic stainless steel within a short time by controlling $Cr_2O_3$ content, appropriate composition, and liquid-state fraction, etc., in vacuum oxygen decarburization (VOD) slag to maximize vacuum decarburization refining efficiency.

BACKGROUND ART

Generally, a ferritic stainless steel with a chrome (Cr) concentration of 10 to 30 wt % is applied to applications requiring a high corrosion resistance/high workability. At this time, in order to improve the corrosion resistance and the workability, it is required that concentration of carbon, which is an interstitial element, is included therein in a very low level as much as 100 ppm or less (in a special case, 50 ppm or less). In this case, since a usual dilution decarburization AOD refining method has a limitation, a vacuum VOD refining method is applied. In order to accomplish this, the following vacuum decarburization techniques have been reported.

In Japan Patent Laid-Open Publication No. 1997-316528, in order to perform vacuum decarburization refining reducing a phenomenon that molten steel is fused to a vacuum bath, an inner wall of a submerged pipe and a tip of an oxygen lance due to a scattering, i.e., a splash phenomenon of stainless molten steel at the time of oxygen blowing and at the same time, reducing Cr loss, a method producing melting slag by adding about 440 to 2560 kg of flux having a composition in which basicity (% CaO % $SiO_2$, hereinafter, denoted as C/S) is 1 to 4 before beginning decarburization and content of $Al_2O_3$ is 5 to 30 wt % to the submerged pipe and then, vacuum refining the melting slag has been proposed. However, the slag composition, which is slag composition corresponding to a case on the assumption that silicon Si is deoxidized, may not be applied to manufacture of a ferritic molten steel requiring aluminum (Al) deoxidization.

In Japan Patent No. JP3616423, in order to solve decarburization speed reduction in a ultra low carbon region, accuracy reduction in controlling a point of time of completion of oxygen blowing, Cr oxidization and slag fluidity deterioration by excess oxygen blowing, and resulting increase in consumption amount of reductant such as Si, Al, etc., at the time of decarburization of the stainless molten steel by the VOD refining method, a method controlling C/S of slag after pre-decarburization to be in a range of 1.5 to 3.5, injecting CaO—$Al_2O_3$ based flux thereto to control slag composition ((wt % CaO)/(wt % $SiO_2$+wt % $Al_2O_3$), hereinafter denoted as C/(S+A)) in a range of 1.2 to 3.0, and when generation amount of $Cr_2O_3$ calculated from concentration of oxygen in gas after oxygen blowing under vacuum becomes 40% or less, stopping the blowing and then promoting the decarburization by gas stirring has been proposed. However, in the case of injecting the CaO—$Al_2O_3$ based flux in order to control the composition (C/(S+A)) to be in the range of 1.2 to 3.0 before vacuum beginning, the C/S ratio of the slag and weight (or volume) of the slag after the pre-decarburization may be appreciated only through instrumental measurement and analysis and a comparative time is required in order to perform this.

In Japan Patent Publication No. 3752801, in order to suppress Cr loss and shorten a decarburization process at the time of the decarburization refining of the stainless molten steel under a reduced pressure, concentration of carbon in the molten steel is set to 0.25 to 0.1 wt % and the oxygen blowing is performed under the reduced pressure after non-deoxidization tapping. Herein, it has been proposed to set supply flow of inert gas on a bottom of a ladle to 5N1/min·t-steel or more and to set weight of the slag generated at this time to 15 kg/t-steel or less. However, it has a problem that in order to control the weight of the slag generated at the time of the oxygen blowing to 15 kg/t-steel or less, the blowing should be temporarily suspended to measure the weight of the slag during the oxygen blowing under vacuum. Also, a problem that after releasing vacuum and measuring slag weight under atmospheric pressure, the oxygen blowing should again be performed under the vacuum may occur.

In Korean Patent No. KR10-0523105, in order to promote decarburization reaction by slag at the time of refining of a ferritic stainless steel containing an ultra low carbon by the VOD method and to suppress carbon contamination (referred to as C pick-up) in the molten steel after the completion of the decarburization, a method controlling the content of $Cr_2O_3$ in the slag to be in a range of 25 to 45 wt % and the (wt % CaO)/(wt % $Al_2O_3$ (hereinafter, represented as C/A) ratio to be 1.0 or less after the completion of the oxygen blowing and injecting CaO in a vacuum decarburization step has been proposed. However, it may be appreciated from an equilibrium state view of CaO—$Al_2O_3$—$Cr_2O_3$ slag corresponding to refining temperature at about 1700° C. that a thermodynamically very stable corundum (chemical symbol $(Cr,Al)_2O_3$) compound is generated due to reaction between $Cr_2O_3$ and $Al_2O_3$ in the slag in a composition range of C/A<0.7, which causes a result lowering driving force of the decarburization reaction by a thermodynamic principle.

In Japan Patent Laid-Open No. 2006-213960, in order to decarburizate stainless steel to have a high decarburization efficiency and be able to suppress C pick-up, the concentration of the oxygen in the molten steel is measured before/after the vacuum decarburization by stirring of inert gas after the completion of the oxygen blowing under vacuum. Then, a method estimating the content of $Cr_2O_3$ in the slag by a pre-calculated equation to add deoxidizer so that final content thereof becomes a range of 10 to 30 wt % has been proposed. However, in order to measure the concentration of the oxygen in the molten steel, an expensive oxygen sensor should always be used, which causes increase in cost and refining time. Also, although the concentration of $Cr_2O_3$ in the slag is estimated from the concentration of the oxygen in the molten steel, in order to calculate injection amount of the deoxidizer for controlling the content of $Cr_2O_3$ to become the range of 10 to 30 wt %, there should be information on weight (or volume) of the slag. However, a specific method with respect to this has not been proposed.

DISCLOSURE OF INVENTION

Technical Problem

Therefore, the present invention proposes to solve the foregoing problems. It is an object of the present invention to provide a method of manufacturing an ultra low carbon ferritic stainless steel within a short time by controlling $Cr_2O_3$ content, appropriate composition, and liquid-state fraction in slag in a VOD vacuum decarburization refining process to maximize vacuum decarburization refining efficiency.

Technical Solution

There is provided a method of manufacturing an ultra low carbon ferritic stainless steel according to one embodiment of the present invention comprising: tapping molten steel to a ladle in a non-deoxidized state after pre-decarburization and denitrification in an AOD refining furnace and then removing non-deoxidized slag on an upper of the molten steel of the ladle; seating the ladle to a large vacuum furnace, reducing pressure and then blowing-in oxygen gas from the upper of the molten steel through a lance, thereby performing decarburization reaction; creating $Al_2O_3$ by injecting Al at point of time of beginning of oxygen blowing; forming CaO—$Al_2O_3$—$Cr_2O_3$—MgO-based slag by injecting calcium oxide at point of time of completion of the oxygen blowing to allow vacuum fine decarburization to be promoted by reaction between $Cr_2O_3$ in the slag and C in the molten steel through reaction of the molten steel and the slag with a good fluidity after the completion of the oxygen blowing; and supplying inert gas such as Ar through a porous plug on a bottom of the ladle in order to maximize efficiency of the vacuum fine decarburization.

Also, there is provided a method of manufacturing an ultra low carbon ferritic stainless steel according to another embodiment of the present invention comprising: tapping molten steel to a ladle in a non-deoxidized state after pre-decarburization and denitrification in an AOD refining furnace and then removing non-deoxidized slag on an upper of the molten steel of the ladle; seating the ladle to a large vacuum furnace, reducing pressure and then blowing-in oxygen gas from the upper of the molten steel through a lance, thereby performing decarburization reaction; forming CaO—$Al_2O_3$—$Cr_2O_3$—MgO-based slag by injecting $CaO.Al_2O_3$ flux using a vacuum hopper at point of time of completion of the oxygen blowing; allowing vacuum fine decarburization to be promoted by reaction between $Cr_2O_3$ in the slag and C in the molten steel through an active reaction of the molten steel and the slag with a good fluidity after the completion of the oxygen blowing; and supplying inert gas such as Ar through a porous plug on a bottom of the ladle in order to maximize efficiency of the vacuum fine decarburization.

In the present invention, concentrations of carbon and nitrogen in the molten steel after completion of the AOD pre-decarburization are preferably 0.2 to 0.4 wt % and 100 ppm or less, respectively.

Also, in the present invention, an oxygen blower is preferably supplied with the oxygen gas with flow of 1000 to 1600 $Nm^3/hr$ to perform decarburization.

Also, in the present invention, Al of 1.2 to 3.8 kg/t-steel is preferably injected at the point of time of the beginning of the oxygen blowing.

Also, in the present invention, the calcium oxide of 2.5 to 5.0 kg/t-steel is preferably injected at the point of time of the completion of the oxygen blowing.

Also, in the present invention, the $CaO.Al_2O_3$ flux with a size of 10 to 50 is injected by 7 to 10 kg/t-steel.

Also, in the present invention, the slag is indicated as (wt % CaO)/(wt % $Al_2O_3$): 0.5 to 1.0, $Cr_2O_3$: 15 to 60 wt %, and MoG<7 wt %, and the $CaO.Al_2O_3$ flux is indicated as (wt % CaO)/(wt % $Al_2O_3$): 0.5 to 0.8 and $(SiO_2) \pm (MgO) + (TiO_2) < 15$ wt %.

ADVANTAGEOUS EFFECTS

As compared to a method of manufacturing an ultra low carbon ferritic stainless steel relying on an excess oxygen blowing previously practiced, the present invention can produce an ultra low carbon ferritic stainless steel controlling an optimal slag composition in which the product of activity and liquid-state fraction of chrome oxide in slag is high by injection of bulk $CaO.Al_2O_3$ flux after the completion of blowing of oxygen in a certain amount to maximize efficiency of vacuum fine decarburization in a low carbon region, thereby reducing corrosion resistance and workability.

BRIEF DESCRIPTION OF THE DRAWINGS

FIG. 1 is a flow chart of a method of fabricating an ultra low carbon ferritic stainless steel according to an exemplary embodiment of the present invention.

FIG. 2 is a graph showing an influence of content of chrome oxide on liquid-state fraction of CaO—$Al_2O_3$—$Cr_2O_2$-5 wt % MgO quaternary slag at 1700° C.

FIG. 3 is a graph showing a thermodynamic activity of the chrome oxide in a liquid-state region of the CaO—$Al_2O_3$—$Cr_2O_3$-5 wt % MgO quaternary slag at 1700° C.

FIG. 4 is a graph showing the product of the liquid-state fraction of the slag and the activity of the chrome oxide with respect to the content of the chrome oxide.

FIG. 5 is a graph showing decarburization efficiency of a ferritic stainless molten steel containing 21 wt % Cr according to the C/A ratio of slag and content of chrome oxide in a vacuum condition at 1600° C.

FIG. 6 is an equilibrium state view showing a stable state of CaO—$Al_2O_3$—$Cr_2O_3$-5 wt % MgO quaternary slag at 1700° C.

BEST MODE FOR CARRYING OUT THE INVENTION

Hereinafter, the embodiments of the present invention will be described with reference to the accompanying drawings.

FIG. 1 is a flow chart of a method of fabricating an ultra low carbon ferritic stainless steel according to an exemplary embodiment of the present invention. The method of fabricating the ultra low carbon ferritic stainless steel according to an exemplary embodiment of the present invention comprises: tapping molten steel containing nitrogen of 100 ppm or less and carbon of 0.2 to 0.4 wt % to a ladle in a non-deoxidized state (indicating a state of not adding deoxidizer such as Al or FeSi, etc.) by performing pre-decarburization and denitrification refining in an AOD refining furnace; removing the non-deoxidized slag floating in an upper of the molten steel of the ladle; seating the ladle to a large vacuum furnace and then reducing pressure below 100 mbar; performing decarburization reaction by blowing-in oxygen gas (referred to as oxygen blowing) with flow of 1000 to 1600 $Nm^3/hr$ from the upper of the molten steel through a lance; artificially creating $Al_2O_3$ by injecting Al of 1.2 to 3.8 kg/t-steel at point of time of beginning of the oxygen blowing; forming CaO—$Al_2O_3$—$Cr_2O_3$—MgO-based slag with a resultingly good fluidity by injecting calcium oxide of 2.5 to 5.0 kg/t-steel at point of time of completion of the oxygen blowing or omitting the foregoing two steps and forming CaO—$Al_2O_3$—$Cr_2O_3$—MgO-based slag with a good fluidity by injecting CaO.Al$_2$O$_3$ flux by 7 to 10 kg/t-steel at a size of 10 to 50 mm using a vacuum hopper at the point of time of completion of the oxygen blowing; allowing vacuum (below 10 mbar) fine decarburization to be promoted by reaction between Cr$_2$O$_3$ in the slag and C in the molten steel through an active reaction of the molten steel and the slag with the good fluidity after the completion of the oxygen blowing; and supplying inert gas such as Ar through a porous plug on a bottom of the ladle in order to maximize efficiency of the vacuum fine decarburization.

FIG. 2 is a graph showing an influence of content of chrome oxide on liquid-state fraction ($f_{liquid}$) of CaO—Al$_2$O$_3$—Cr$_2$O$_3$-5 wt % MgO quaternary slag at 1700° C. It may be appreciated that in the case where the content of the chrome oxide in the slag is 20 wt % or less, liquid state of 90% or more is secured regardless of the C/A ratio of the slag, while in the case where the content of the chrome oxide in the slag is 30 wt % or more, as the C/A ratio of the slag increases, the $f_{liquid}$ is rapidly reduced.

FIG. 3 is a graph showing a thermodynamic activity ($a_{CrOx}$) of the chrome oxide in a liquid-state region of the CaO—Al$_2$O$_3$—Cr$_2$O$_3$-5 wt % MgO quaternary slag at 1700° C. It may be appreciated that when the content of the chrome oxide in the slag is 60 wt % or less, as the C/A ratio of the slag increases, the $a_{CrOx}$ is rapidly reduced. Also, in the case where the C/A is 0.5, the $a_{CrOx}$ increases according to the content of the chrome oxide and then indicates a certain value at the content of the chrome oxide in 30 wt % or more, while in the case where C/A≦1.0, as the content of the chrome oxide increases up to about 60 wt %, the $a_{CrOx}$ shows a tendency to linearly increase.

FIG. 4 may be induced from the results of FIGS. 2 and 3, and is a graph showing the product of the liquid-state fraction of the slag and the activity of the chrome oxide with respect to the content of the chrome oxide. As the C/A ratio of the slag increases, the value of $f_{liquid} \times a_{CrOx}$ reduces, and in the same C/A ratio, it shows a tendency to have a maximum value with respect to the concentration of the chrome oxide.

According to an already known document, in a region where a carbon concentration is high, carbon in the molten steel is removed as CO gas by the reaction of Equation 1 below. At this time, it is known that decarburization reaction may be promoted by sufficiently supplying oxygen gas with a high flow.

$$[C]+1/2O_2=CO(g) \qquad (1)$$

Herein, (g) means a gas state. However, when concentration of the carbon in the molten steel reduces to a concentration region below several hundred ppm, speed of the decarburization reaction is rapidly reduced and at the same time, Cr which is a main alloy component of the molten steel, is oxidized into Cr$_2$O$_3$ by Equation 2 below.

$$2[Cr]+3/2O_2(g)=(Cr_2O_3) \qquad (2)$$

Therefore, the supply of the oxygen gas is blocked in a region where the carbon concentration is low, and reaction equation such as Equation 3 below is induced between the Cr$_2$O$_3$ generated in the oxygen blower and the carbon in the molten steel.

$$(Cr_2O_3)=3[C]+3[Cr]+3CO(g) \qquad (3)$$

An equilibrium constant of the decarburization reaction shown in Equation 3 may be written as in Equation 4 below.

$$K=\frac{a_{Cr}^2 \cdot P_{CO}^3}{a_{Cr_2O_3} \cdot a_C^3}$$

It may be appreciated from the equation 4 that as a $a_{Cr2CO3}$, which is activity of the chrome oxide in the slag, is large and pco, which is a partial pressure of the CO gas, is low, a driving force of the decarburization reaction becomes large. Here, when a vacuum condition is constant, efficiency of the decarburization reaction depends on the $a_{Cr2O3}$. However, a real reaction is affected by such a thermodynamic driving force as well as a kinetic factor, which implies that fluidity of the slag has an effect on the decarburization reaction. A pure Cr$_2$O$_3$, which is an oxide with a very high melting point (about 2330° C.), exists in a solid state at 1600 to 1700° C., which is a general refining temperature. Therefore, it is thermodynamically most preferable that the pure Cr and the carbon in the molten steel are reacted, while speed of the reaction is very slow and it is impossible to finish refining up to a desired level of carbon concentration within a proper time. Accordingly, although $a_{Cr2O3}$ reduces, it is indispensable to secure a proper fluidity of the slag. To this end, it is indispensably required to form a flowable slag by injecting an additive (hereinafter, referred to as flux).

As described in FIGS. 2 to 4, it is possible to thermodynamically compute the liquid-state fraction of the slag and the activity of Cr$_2$O$_3$ by diluting the Cr$_2$O$_3$ generated in the oxygen blower through addition of components such as (CaO), (Al$_2$O$_3$), (MgO), etc. Preferably, it is necessary to select a region where the product of the two values is high. At this time, CaO may be injected in a calcium oxide form, and MgO is naturally generated due to a physicochemical cause from a VOD ladle refractory in the oxygen blower. However, since a pure Al$_2$O$_3$ is very expensive, it is difficult to singly add the pure Al$_2$O$_3$. In order to solve this, a following method may be used.

First, a certain amount of Al is injected in the beginning of the oxygen blowing, thereby making it possible to create Al$_2$O$_3$ by Equation 5 below.

$$2[Al]+3[O]=(Al_2O_3) \qquad (5)$$

Therefore, Al$_2$O$_3$, Cr$_2$O$_3$, and a small amount of MgO are created in the oxygen blower, and the calcium oxide is injected after the completion of the oxygen blowing, thereby making it possible to form the CaO—Al$_2$O$_3$—Cr$_2$O$_3$—MgO slag having a high $f_{liquid} \times a_{CrOx}$ value.

Second, in order to create Al$_2$O$_3$ by injecting Al in the beginning of the oxygen blowing as described above, blowing time is further required together with an additional oxygen supply. Therefore, more preferably, a certain amount of bulk CaO.Al$_2$O$_3$ flux is injected in a vacuum state after the completion of the oxygen blowing, thereby making it possible to form the CaO—Al$_2$O$_3$—Cr$_2$O$_3$—MgO slag having the high $f_{liquid} \times a_{CrOx}$ value. In this case, it is possible to simultaneously satisfy an effect reducing refining time and an effect increasing decarburization efficiency, as compared to the first method.

FIG. 5 a graph showing decarburization efficiency of a ferritic stainless molten steel containing 21 wt % Cr according to the C/A ratio of slag and content of the chrome oxide in a vacuum condition at 1650° C. Herein, the decarburization efficiency may be found by Equation 6 below.

Decarburization Efficiency (%)={1−(final carbon concentration)/(initial carbon concentration)×100 (6)

It may be appreciated that a case where the C/A ratio of the slag is 0.6 shows the decarburization efficiency higher than a case where it is 1.3, and a case where the content of the chrome oxide in the slag is 60 wt % shows the decarburization efficiency higher than a case where it is 20 wt %, wherein the C/A ratio of the slag is a dominant factor.

Also, vacuum fine decarburization effects have been shown in Table 1 by comparing fine decarburization period slag compositions in a conventional example to cases in the present invention.

TABLE 1

| Classification | Fine decarburization period slag composition | | Carbon concentration difference before/after vacuum fine decarburization (ppm) | remark |
|---|---|---|---|---|
| | C/A ratio | $Cr_2O_3$ (wt %) | $[C]_{vacuum\,fine\,decarburization} - [C]_{oxygen\,blowing}$ | |
| Conventional example 1 | 0.36 | 50.2 | −15 | |
| Conventional example 2 | 0.27 | 89.1 | −9 | |
| Conventional example 3 | 0.51 | 91.5 | −6 | |
| Conventional example 4 | 0.38 | 68.9 | +14 | C pick-up |
| Conventional example 5 | 0.41 | 62.1 | −1 | |
| Conventional example 6 | 0.69 | 79.0 | −7 | |
| Conventional example 7 | 0.43 | 82.6 | +10 | C pick-up |
| Conventional example 8 | 0.21 | 51.8 | −19 | |
| Inventive example 1 | 0.58 | 20.5 | −26 | |
| Inventive example 2 | 0.73 | 16.2 | −41 | |
| Inventive example 3 | 0.82 | 29.4 | −16 | |
| Inventive example 4 | 0.96 | 58.2 | −38 | |
| Inventive example 5 | 0.69 | 59.0 | −27 | |
| Inventive example 6 | 0.60 | 48.3 | −19 | |
| Inventive example 7 | 0.71 | 27.7 | −39 | |
| Inventive example 8 | 0.59 | 39.1 | −22 | |
| Inventive example 9 | 0.74 | 28.9 | −11 | |
| Inventive example 10 | 0.81 | 48.1 | −12 | |

As shown in Table 1, it may be appreciated that the inventive examples have a very excellent fine decarburization effect without generating C-pick up, as compared with the conventional examples.

Referring to FIG. 6, it may be appreciated that composition of an existing fine decarburization slag containing 5 wt % MgO at temperature of at 1700° C. is C/A<1.0, $(Cr_2O_3)$>50 wt %, and corresponds to a state where $MgO.Cr_2O_3$ chromite, $(Al,Cr)_2O_3$ corundum, and $(Mg,Al(Al,Cr)_2O_4$ spinel compounds co-exist mainly together with liquid-state slag. In this case, since generation of a thermodynamically very stable compound, such as corundum, spinel, means reduction of the activity of $Cr_2O_3$ in the slag as described in the above Equations 3 and 4, it causes deterioration of the decarburization efficiency. However, it may be appreciated that the composition of the fine decarburization slag proposed in the present invention is $0.5 \leq (C/A) \leq 1.0$, $15 \leq$ (wt % $Cr_2O_3) \leq 60$, and corresponds to a state where the chromite co-exists mainly together with the liquid-state slag and a small amount of $CaO.Cr_2O_3$, $Cr_2O_3$, corundum compound exists. According an already known document, it may be appreciated that since the chromite compound is relatively easily decomposed and solved as compared to corundum or spinel compound, the efficiency of the decarburization reaction is not largely reduced.

As a result, at the time of vacuum decarburization of the ultra low carbon ferritic stainless molten steel, a method optimizing the C/A ratio of the fine decarburization slag and the content of $Cr_2O_3$ and applying injection time, injection amount, and an injection method of $CaO.Al_2O_3$ flux or injecting Al before the beginning of the oxygen blowing and injecting the calcium oxide after the completion of the oxygen blowing proposed in the present invention in order to satisfy optimization of the C/A ratio of the fine decarburization slag and the content of $Cr_2O_3$ is applied, thereby making it possible to obtain carbon concentration of a level below 50 ppm.

(Embodiment)

Hereinafter, an exemplary embodiment of the present invention will be described.

After melting scrap iron and ferroalloy in an electrical furnace to have an Fe-18% Cr composition, they were tapped to the ladle at temperature of 1700° C. through a pre-decarburization process in the AOD refining furnace. The molten steel and the slag existed in the ladle, and in order to raise the efficiency of the vacuum decarburization, the slag was removed by a mechanical method. At this time, the molten steel temperature was measured as 1630° C., the carbon concentration was measured as 0.26 wt %, and the nitrogen concentration was measured as 95 ppm. At this time, when the carbon concentration is 0.2% or less, generation amount of CO bubbles is little at the time of the vacuum refining to be unable to expect a denitrification reaction promotion effect, and when it exceeds 0.4%, a problem that the refining time becomes very long can occur. Also, when the nitrogen concentration exceeds 100 ppm, although the denitrification reaction is performed by the CO bubble at the time of the vacuum refining, it may be difficult to arrive at a low nitrogen concentration of a desired level. The decarburization refining was performed during 30 minute by moving the ladle to a decarburization refining stand in which the vacuum furnace is positioned, laying a cover thereon, and then supplying gas oxygen using the lance on an upper of the molten steel. After completion of the reaction, the molten steel temperature was raised up to 1760° C., and the molten steel composition was analyzed as in Table 2 below.

TABLE 2

| | Composition | | | | | | |
|---|---|---|---|---|---|---|---|
| | Cr | Si | Mn | Al | Ti | C | N |
| Concentration | 17.1 | 0.01 | 0.02 | 0.002 | 0.001 | 0.0063 | 0.0092 |

The fine decarburization was performed during 20 minute by a strong stirring by injecting $CaO.Al_2O_3$ flux with a size of 10 to 50 mm by 8.8 kg/t-steel using a hopper under vacuum atmosphere immediately after the completion of the oxygen blowing and by supplying Ar on a bottom of the ladle. After performing the fine decarburization, a result picking and analyzing a slag sample was indicated in Table 3, and the molten steel composition was indicated in Table 4.

TABLE 3

| | Composition | | | | | | |
|---|---|---|---|---|---|---|---|
| | CaO | $Al_2O_3$ | $Cr_2O_3$ | MgO | $SiO_2$ | MnO | $TiO_2$ |
| Concentration | 12.5 | 18.1 | 59.3 | 6.3 | 1.2 | 0.5 | 1.4 |

TABLE 4

| | Composition | | | | | | |
|---|---|---|---|---|---|---|---|
| | Cr | Si | Mn | Al | Ti | C | N |
| Concentration | 17.2 | 0.03 | 0.02 | 0.008 | 0.001 | 0.0039 | 0.0087 |

From the slag composition of Table 3, the C/A of the slag was 0.69, the content of the chrome oxide was 59.3 wt %, and the content of (MgO) was 6.3 wt %, which satisfied a range proposed in the present invention. As a result, it was possible to obtain carbon concentration of 39 ppm in the molten steel. For the purpose of reducing the chrome oxide and deoxidizing the molten steel after the completion of the vacuum fine decarburization, Al and Ti sponges were injected to finally adjust the concentrations of Al and Ti. Compositions of the molten steel after the completion of the final vacuum refining were indicated in Table 5 below.

TABLE 5

| | Composition | | | | | | |
|---|---|---|---|---|---|---|---|
| | Cr | Si | Mn | Al | Ti | C | N |
| Concentration | 18.1 | 0.09 | 0.12 | 0.078 | 0.27 | 0.0044 | 0.0093 |

It may be appreciated that while there was a small amount of C, N pick-up phenomenon by injection of various ferroalloys under vacuum, it is a very small level as compared to pick-up degree at the time of application of the conventional technique.

An optimal embodiment of the present invention has been disclosed through the specific description and the drawings as above. Terms were used in order to describe the present invention, rather than limitation of meaning or limitation of the scope of the present invention described in claims. Therefore, it would be appreciated by those skilled in the art that various modifications and equivalent other embodiments are possible herein. Accordingly, the scope of the present should be defined by technical idea of accompanying claims.

The invention claimed is:

1. A method of manufacturing an ultra low carbon ferritic stainless steel comprising:
    tapping molten steel to a ladle in a non-deoxidized state after pre-decarburization and denitrification in an argon oxygen decarburization refining furnace and then removing non-deoxidized slag;
    placing the ladle in a vacuum furnace, reducing pressure and then blowing-in oxygen gas from the upper of the molten steel through a lance;
    creating $Al_2O_3$ by injecting Al at point of time of beginning of oxygen blowing;
    forming CaO—$Al_2O_3$—$Cr_2O_3$—MgO-based slag by injecting calcium oxide at point of time of completion of the oxygen blowing; and
    supplying inert gas through a porous plug on a bottom of the ladle,
    wherein the CaO—$Al_2O_3$—$Cr_2O_3$—MgO-based slag is indicated as (wt % CaO)/(wt % $Al_2O_3$): 0.5 to 1.0, $Cr_2O_3$: 15 to 60 wt %, and MgO<7 wt %.

2. The method of manufacturing the ultra low carbon ferritic stainless steel according to claim 1, wherein Al of 1.2 to 3.8 kg/t-steel is injected at the point of time of the beginning of the oxygen blowing.

3. The method of manufacturing the ultra low carbon ferritic stainless steel according to claim 1, wherein the calcium oxide of 2.5 to 5.0 kg/t-steel is injected at the point of time of the completion of the oxygen blowing.

4. A method of manufacturing an ultra low carbon ferritic stainless steel comprising:
    tapping molten steel to a ladle in a non-deoxidized state after pre-decarburization and denitrification in an argon oxygen decarburization refining furnace and then removing non-deoxidized slag;
    placing the ladle a vacuum furnace, reducing pressure and then blowing-in oxygen gas from the upper of the molten steel through a lance;
    forming CaO—$Al_2O_3$—$Cr_2O_3$—MgO-based slag by injecting $CaO.Al_2O_3$ flux at point of time of completion of the oxygen blowing; and
    supplying inert gas through a porous plug on a bottom of the ladle,
    wherein the CaO—$Al_2O_3$—$Cr_2O_3$—MgO-based slag is indicated as (wt % CaO)/(wt % $Al_2O_3$): 0.5 to 1.0, $Cr_2O_3$: 15 to 60 wt %, and MgO<7 wt %.

5. The method of manufacturing the ultra low carbon ferritic stainless steel according to claim 1 or claim 4, wherein concentrations of carbon and nitrogen in the molten steel after completion of the argon oxygen decarburization pre-decarburization are 0.2 to 0.4 wt % and 100 ppm or less, respectively.

6. The method of manufacturing the ultra low carbon ferritic stainless steel according to claim 1 or claim 4, wherein an oxygen blower is supplied with the oxygen gas at a flow of 1000 to 1600 $Nm^3$/hr to blow-in oxygen gas.

7. The method of manufacturing the ultra low carbon ferritic stainless steel according to claim 4, wherein the $CaO.Al_2O_3$ flux with a size of 10 to 50 mm is injected by 7 to 10 kg/t-steel.

8. The method of manufacturing the ultra low carbon ferritic stainless steel according to claim 4, wherein the $CaO.Al_2O_3$ flux is indicated as (wt % CaO)/(wt % $Al_2O_3$): 0.5 to 0.8 and $(SiO_2)+(MgO)+(TiO_2)<15$ wt %.

* * * * *